Sept. 24, 1946.   H. G. NASH   2,408,223
ROTARY GATE VALVE
Filed Dec. 17, 1943   2 Sheets-Sheet 1

INVENTOR
HERBERT G. NASH
BY
ATTORNEYS

Sept. 24, 1946.    H. G. NASH    2,408,223
ROTARY GATE VALVE
Filed Dec. 17, 1943    2 Sheets-Sheet 2
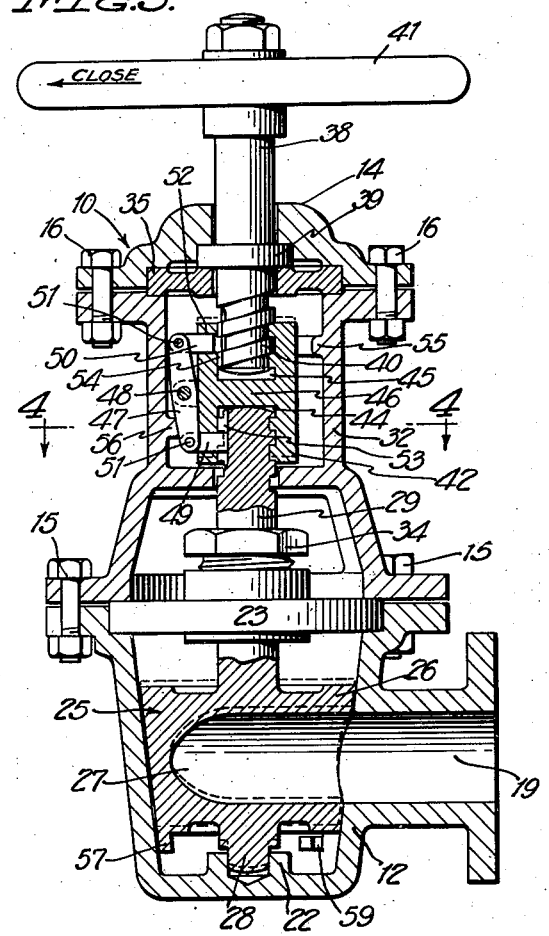
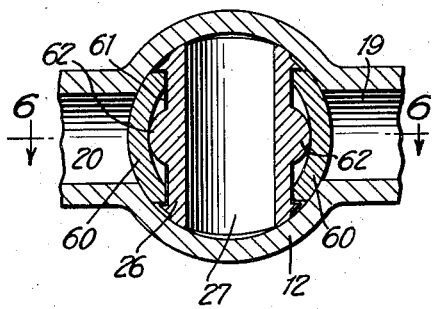
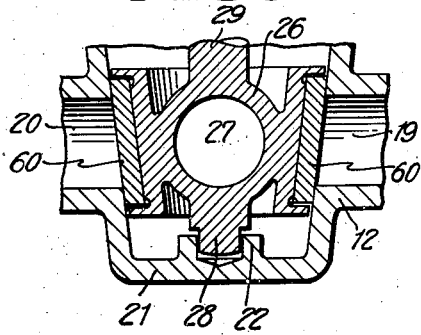
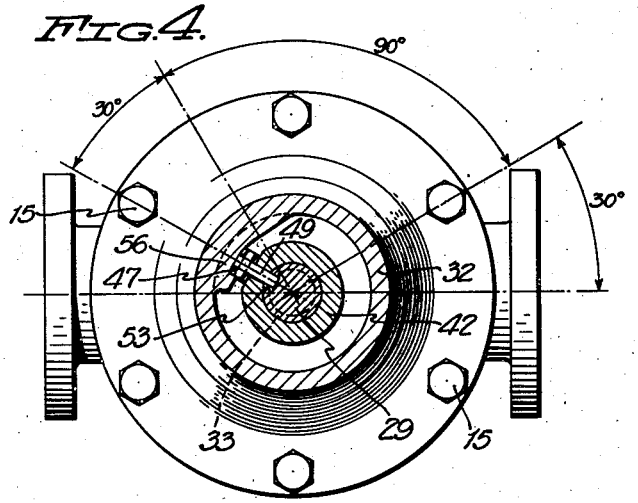
INVENTOR
HERBERT G. NASH
BY
ATTORNEYS Patented Sept. 24, 1946

2,408,223

UNITED STATES PATENT OFFICE 2,408,223

ROTARY GATE VALVE

Herbert G. Nash, Kew Gardens, N. Y.

Application December 17, 1943, Serial No. 514,626

2 Claims. (Cl. 74—22)

This invention relates to improvements in valve structures and more specifically to a rotary gate valve.

The primary object of the invention resides in a rotary valve in which the rotary valve member may be successively freed from its seat, rotated from closed to open position or vice versa, and subsequently reseated upon its valve seat by means of a single continuous manipulation of the valve actuating means.

Other novel features of the invention will become apparent as the following specification is read in conjunction with the accompanying drawings, in which, Figure 1 is a vertical sectional view of my valve with the parts in valve closing position, the valve member being illustrated in seated engagement with its seat in full lines, and in freed relation thereto in dotted lines.

Figure 3 is a vertical sectional view taken on the line 3—3 of Figure 2, with the parts of the valve shown in open position, the valve member being shown seated in full lines and in raised unseated position in dotted lines.

Figure 4 is a horizontal sectional view on the line 4—4 of Figure 3.

Figure 5 is a fragmentary horizontal sectional view on the line 5—5 of Figure 1.

Figure 6 is a fragmentary vertical sectional view on the line 6—6 of Figure 5.

Figure 1:
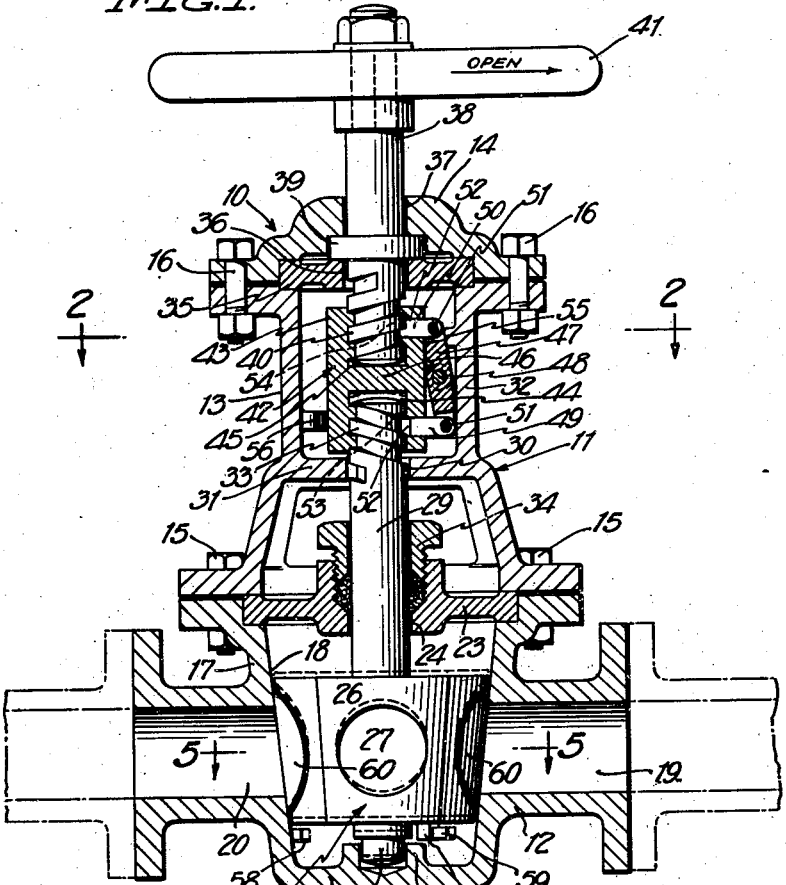

Referring to the drawings by reference characters, the numeral 10 designates my improved valve in its entirety which includes a valve body 11 composed of a lower annular casing section 12, an intermediate or bonnet section 13, and a cap section 14. The sections 12, 13 and 14 are arranged in superposed relation with the bonnet section 13 bolted to the open top of the lower section as at 15, and with the cap section bolted to the top of the bonnet section as at 16.

The lower section 12 is cast in one piece and includes a valve casing 17 having a downwardly tapered valve seat 18. The casing also includes diametrically opposed inlet and outlet ports 19 and 20 respectively which open through the valve seat 18. The bottom 21 of the casing is closed and is provided with a central bearing 22. Interposed between the lower section 12 and the bonnet 13 is a bearing plate 23, which plate closes the top of the casing and has a bearing opening 24 in axial alinement with the bearing 22.

Mounted within the casing 17 for rotative and vertical movement is a valve member 25 which includes an annular tapered plug body 26 having a straight transverse passage 27 extending therethrough. The taper of the plug body 26 is complementary to that of the valve seat 18 for seating engagement therewith. Depending from the plug body 26 axially thereof is a stud 28 which is slidably and rotatably disposed in the bearing 22. Rising upwardly from the valve body 26 centrally and axially therefrom is a valve stem 29, the same freely passing through the bearing opening 24 and an axially alined bearing opening 30 in the bottom wall 31 of a cylindrical casing 32, which casing constitutes the upper portion of the bonnet 13. The upper free end of the stem 29 extends into the casing 32 and is provided with left screw threads 33. A packing gland 34 carried by the plate 23 surrounds the stem 29 to seal the bearing between said stem and plate.

Interposed between the top of the bonnet 13 and the cap 14 is a bearing plate 35 having a bearing opening 36 coaxial with the stem 29 and with a bearing opening 37 in the cap section 14. Journalled in the bearing openings 37 and 36 is an actuating stem 38 having a collar 39 disposed between the cap section 14 and bearing plate 35 and which forms a swivel connection between the stem 38 and cap section 14 for reasons to be hereinafter explained. The lower or inner end of the stem 38 extends into the bonnet casing 32 in spaced coaxial relation to the upper end of the stem 29 and is provided with right screw threads 40. The top or outer end of the stem 38 has a manipulating element in the form of a handwheel 41 fixed thereto.

The spaced threaded ends of the stems 29 and 38 are connected by a coupling member 42 which comprises a cylindrical body 43 having threaded sockets 44 and 45 respectively which are complementary to and threadedly engage the threaded portions 33 and 40. A transverse partition wall 46 separates the sockets 44 and 45 and when the valve member 25 is in closed seated position as illustrated in Figure 1 the lower end of the stem 38 abuts the partition wall 46, while the upper end of the stem 29 is in spaced relation to said partition wall. However, when the valve member 25 is in open seated position as shown in Figure 3, the lower end of the stem 38 is disposed in spaced relation to the wall 46 while the upper end of the stem 29 is in contacting engagement therewith for reasons to be hereafter pointed out.

The coupling member 42 constitutes a double nut which is alternately keyed to the respective stems 29 and 38 during each complete turning of the valve member 25 from seated closed to seated open position and vice versa. The actual turning movement of the valve member from closed to open position and vice versa is through an arc of 90° as illustrated in Figure 4, there being an added 30° turning movement of the actuating stem 38 relative to the valve member 25 and its stem 29 prior to turning movements of the valve member to either open or closed positions and also a 30° turning movement of the stem 38 subsequent to the limit of movement of the valve member to either open or closed position. Thus as each single continuous turning movement in one direction is imparted to the actuating stem 38 to move the valve member from open to closed position, or vice versa, the stem 38 and its actuating handwheel 41 travels a total of 150° of a circle. The degrees of turning movements stated herein are arbitrary and may vary if desired.

For alternately keying the stems 29 and 38 to the coupling member 42, I provide a vertically disposed rock arm 47 which is pivoted to the flattened side of the member 42 as at 48. Flat locking keys 49 and 50 are respectively connected to the lower and upper ends of the rock arm 47 by pin and slot connections 51. The locking keys 49 and 50 freely slide through horizontal openings 52 in the body 43 of member 42 for alternate entry into keyways 53 and 54 in the stems 29 and 38. When the valve member 25 is in closed seated position and during its turning movement to open unseated position, the key 49 is free of its keyway 53 while the key 50 is extending into its keyway 54. When the valve member 25 reaches open position with the passage 27 in register with the ports 19 and 20, the positions of the keys are reversed, that is, the key 50 is disengaged from its keyway 54 and the key 49 simultaneously moved into its keyway 53. The reverse actuation takes place during turning movement of the valve member 25 from open seated position to closed seated position and is accomplished by cams 55 and 56 respectively disposed above and below the plane of the pivotal axis of the rock arm 47 and disposed in the path of the outer sides thereof.

For limiting the turning movements of the valve member 25 to open and closed positions within the range of an arc of 90°, I provide a stop lug 57 on the underside of the plug body 26 which is in the circumferential path of a pair of fixed spaced radially disposed stop lugs 58 and 59 respectively (Figure 1).

Figure 2:
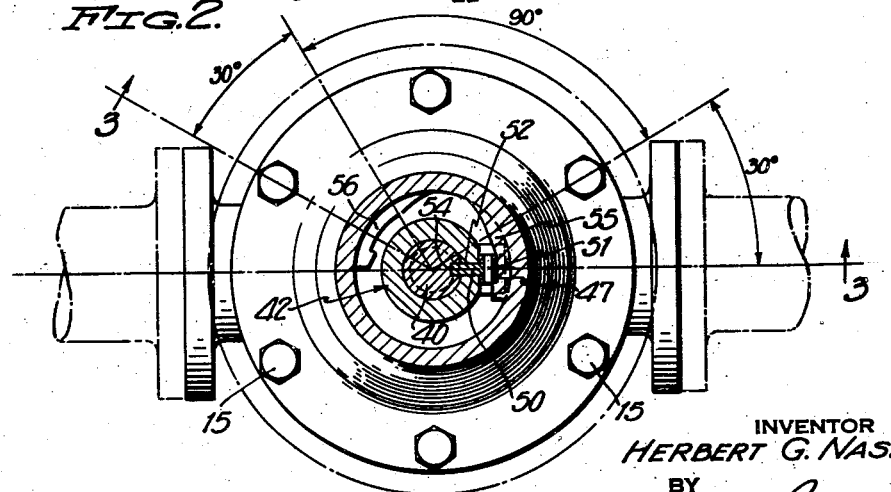
Figure 2 is a horizontal sectional view on the line 2—2 of Figure 1.

In practice, assume that the valve 10 is closed as shown in Figures 1 and 2 and it is desired to open the same. The operator grasps the handwheel 41 and imparts a turning movement thereto in a counterclockwise direction. Upon initial turning of the actuating stem 38 it will cause the coupling member to turn therewith due to the key 50 being in its keyway 54, thus causing the left thread connection 44—33 to impart an upward vertical movement to the stem 29 and its valve member 25 which disengages the valve member 25 from its seat 18 as illustrated in dotted lines in Figure 1. The top end of the valve stem 29 is now engaging the partition wall 46 and continued turning of the actuating stem 38 will cause the valve stem 29, valve member 25, and coupling member 42 to turn as a unit. As the valve member 25 reaches the limit of its turning movement to open position, the lower portion of the rocker arm engages the cam 56 which imparts a rocking movement to the rock arm and causes the retraction of the key 50 from keyway 54 and simultaneously moves the key 49 into its keyway 53. The valve member 25 is still unseated but with the stem 29 keyed to the coupling member 42, continued turning of the stem 38 in a counterclockwise direction will cause the coupling member 42, stem 29, and valve member 25 to move vertically downward to reseat the valve member upon its seat 18 while in an open position as best illustrated in Figure 3.

To move the valve member 25 from its open position shown in Figure 3 to its closed position shown in Figure 1 requires a reverse cycle from that described for moving the same from closed to open position. Assume that the parts are as shown in Figure 3. The operator grasps the handwheel 41 and imparts a clockwise turning movement thereto which causes the stem 38 to thread into its recess 45 and engage wall 46 which imparts a vertical upward movement to be imparted to the stem 29 and its valve member 25 to the dotted position shown in Figure 3. The valve member 25 is now unseated and, continuous turning of the stem 38, causes the coupling member, stem 29 and valve member 25 to turn as a unit to closed position. When reaching closed position, the upper end of the rock arm 47 engages cam 55 causing the rock arm to reverse its position which effects disengagement of the key 49 from its keyway 53 and simultaneously moves key 50 into its keyway 54. The stem 38 is now keyed to coupling member 42 while the stem 29 is unkeyed therefrom. Continued turning movement of the actuating stem 38 will cause the coupling member 42 to turn therewith and impart a vertical downward movement to the stem 29 and valve member 25 to reseat the same to the full line position shown in Figure 1. Thus, by a single continuous turning movement imparted to the manipulating handwheel 41, the valve member 25 may be successively disengaged from its seat, moved to either open or closed position, and finally reseated. The seating of the valve member 25 in both its open and closed positions prevents foreign matter from accumulating within the valve casing which, in time, may build up and affect the free and efficient operation of the valve.

To effect a more positive seating of the valve member 25, I mount rockable gates 60—60 in those opposed outer sides of the valve body 26 which are exposed to the inlet and outlet ports 19 and 20 when the valve member is in closed position. The gate members 60 are concavo-convex in cross section and are respectively disposed in recesses 61—61. The gate members extend substantially the height of the valve body 26 and are of a width to respectively bridge the inlet and outlet ports as best seen in Figure 5. A fulcrum rib 62 extends outwardly from the closed side wall of each recess and on which the related gate 60 fulcrums. The gates 60 are free to rock and adapt themselves to the seat 18 during wear and provide a positive seal between the valve casing 17 and the valve member 25 when the valve is in closed position as best seen by reference to Figures 1, 5, and 6.

While I have shown and described what I consider to be the preferred embodiment of my invention, I wish it to be understood that such changes in construction and design as come within the scope of the appended claims may be resorted to if desired without departing from the spirit of my invention. Though primarily designed for the actuation of valves, the mechanism can of course be utilized in connection with other apparatus that requires to be operated and controlled in the same way.

What I claim is:

1. In a mechanism for imparting lift-turn movements to a member having a stem provided with a threaded portion, an actuating stem in axial alinement with said first stem and in spaced relation to one end thereof, said actuating stem having a threaded portion of a reverse pitch from the threaded portion on the first stem, a coupling nut having opposed screw threaded sockets complementary to the respective threaded portions of the stems and with which they threadingly engage, and means for alternately keying the coupling nut to the stems during a single continuous turning movement of the actuating stem in one direction to impart a lift-turn movement to the first stem, said means including a rock arm pivoted to the coupling nut, key pins pivoted to the ends of the rock arm for alternate reception in keyways provided in the respective stems, and fixed cam elements respectively disposed in the path of the rock arm at opposite sides of the pivotal axis of the rock arm and with which the opposed end portions of the rock arm respectively engage.

2. In a mechanism for imparting lift-turn movements to a member, a rigid housing, a pair of coaxial stems respectively journalled in opposed walls of said housing with their inner ends in spaced relation, reversely pitched screw threads provided on the adjacent end portions of the respective stems, one of said stems being connected to the member to be lifted and turned, a manipulating element fixed to the outer end of the other of said stems, a coupling nut having opposed axially alined screw threaded sockets complementary to the respective threads on said stems and with which they threadingly engage, a rock arm pivoted at the side of the coupling nut, key pins pivoted to the ends of the rock arms, keyways provided in the threaded end of the stems for alternately receiving the key pins, and cam means provided within the housing in the path of the ends of the rock arm and with which the same engages during alternate turning movement of the coupling nut in reverse directions to effect alternate engagement and disengagement of the key pins in their related keyways.

HERBERT G. NASH.